2,860,105
Patented Nov. 11, 1958

2,860,105

METHOD OF MANUFACTURING FERROMAGNETIC CORES

Evert Willem Gorter and Cornelis Jacobus Esveldt, Emmasingel, Eindhoven, Netherlands, assignors, by mesne assignments, to North American Philips Company, Inc., New York, N. Y., a corporation of Delaware Application December 20, 1954, Serial No. 476,531

Claims priority, application Netherlands December 21, 1953

2 Claims. (Cl. 252—62.5)

Magnet cores having an approximately rectangular hysteresis loop are important for various uses. This kind of core is used inter alia for the so-called "magnetic memories" (cf. for example W. N. Papian: "Proceedings of the I. R. E.," April 1952, pages 475–478, and D. R. Brown and E. Albers-Schoenberg: "Electronics," pages 146–149). Such magnetic memories are used for example in counting machines and automatic pilots. These cores are furthermore used in magnetic switches.

The extent to which the shape of the hysteresis loop approaches that of a rectangle may be expressed quantitatively in various ways. A conventional measure may for instance be the quotient $$\frac{B_r}{B_{cl}}$$

Figure 1:
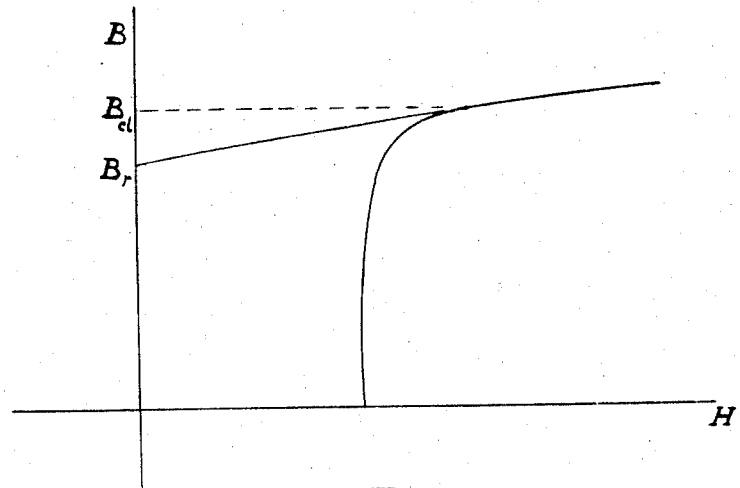

For the explanation of this quotient reference is made to Fig. 1, a diagrammatical representation of part of a saturation-magnetisation curve. In this figure, $B_r$ designates the remanent inductance, whereas $B_{cl}$ designates the inductance at which the hysteresis loop is just closed. In practice it is often difficult to measure $B_{cl}$ with great accuracy. However, an approximately correct value of $B_{cl}$ may be readily found by taking the average of the inductances subsequent to partial magnetisation and partial demagnetisation (with intermediate saturation), the two inductances being measured with the same field strength, which is chosen to be such that the said inductances differ by more than 1%, but by less than 3%. This procedure was assumed with the measurements carried out in accordance with the invention. For these measurements use was made of a ballistic galvanometer (cf. Bozorth: "Ferromagnetism," page 843). Where reference is made herein to the quotient $$\frac{B_r}{B_{cl}}$$

this is assumed to have been measured on an annular magnet core having a constant sectional area of the ferromagnetic material throughout its circumference and having an outer diameter of not more than 1.6 times the inner diameter.

Figure 2:
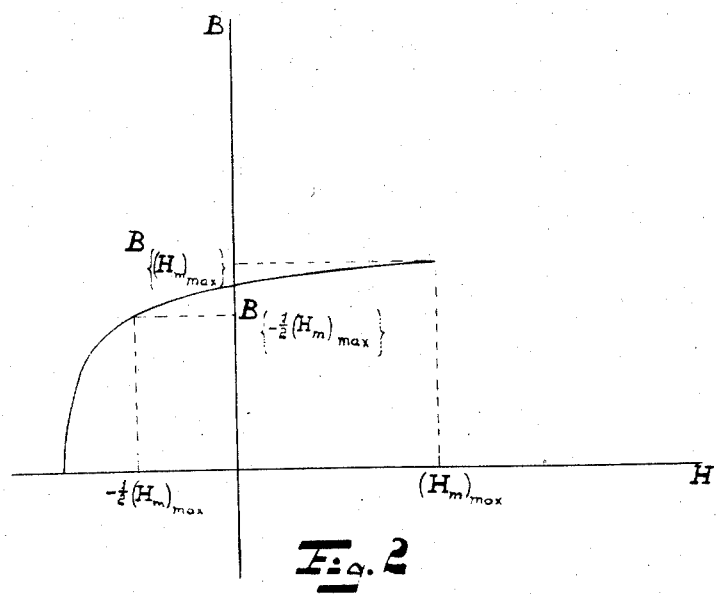

The extent to which the shape of the hysteresis loop approaches that of a rectangle may also be expressed by means of the so-called "squareness ratio" $(R_s)_{max}$. For the meaning of this magnitude reference is made to the aforesaid literature. For completeness' sake a short explanation with reference to Fig. 2 is added, which is also a diagrammatical representation of part of a magnetizing curve, relating to a case in which the demagnetisation was started before the magnetic saturation had been reached. The magnitude $(R_s)_{max}$ is defined by $$\left(\frac{B(-\tfrac{1}{2}H_m)}{B(H_m)}\right)_{max}$$

The quotient $$\frac{B(-\tfrac{1}{2}H_m)}{B(H_m)}$$

is a function of the maximum field strength $H_m$ applied. It is found that this quotient has a maximum value for a particular value of $H_m$, which differs as a rule little from the coercivity $H_c$. This maximum value of the quotient is designated by the symbol $(R_s)_{max}$. The measurements of the values $B(H_m)$ and $B(-\tfrac{1}{2}H_m)$ required to define $(R_s)_{max}$ may be carried out by means of a ballistic galvanometer. The measuring objects are in this case also annular magnet cores having a constant sectional area of the magnetic material throughout the circumference of the ring and having an outer diameter of not more than 1.6 times the inner diameter. With the use of ferromagnetic material having an approximately rectangular hysteresis loop we are mostly concerned with alternating currents of high frequency and therefore the occurrence of eddy currents should be minimized. With the use of ferromagnetic alloys this may be ensured to some extent by composing the magnet core from relatively insulated, very thin layers of the ferromagnetic material. However, it is often very difficult to construct from these thin layers cores having an approximately rectangular hysteresis loop. Consequently, with these high frequencies it is advantageous and with still higher frequencies it is even necessary to use magnetically weak, ferricoxide containing materials with spinel structure, since these materials per se have very poor electric conductivity.

For the serviceability of the magnet cores concerned for magnetic memories and magnetic switches, it is furthermore an essential condition that the coercivity ($H_c$) should be low (preferably not higher than 10 Oersted and preferably even lower than 5 Oersted), since otherwise the electromagnetic losses would be too high. According to the invention it has been found that magnet cores having an approximately rectangular hysteresis loop, in a manner such that the conditions:

$$\frac{B_r}{B_{cl}} > 0.7,\ (R_s)_{max} > 0.6 \text{ and } H_c < 4 \text{ Oersted}$$

are fulfilled, may be obtained by manufacturing them from a material which consists at least mainly of at least one compound of the formula $Cu_xNi_{(1-x)}Fe_2O_4$, wherein $x$ lies between 0.01 and 0.05, these compounds being produced by heating a mixture of copper-nickel- and iron-compounds in the desired weight ratio in a gaseous atmosphere having an oxygen content of more than 50% by volume to a temperature of 1375° C. to 1450° C.

Example

A mixture of copper oxide, CuO, nickel carbonate, $NiCO_3$ and iron oxide, $Fe_2O_3$ is ground in alcohol for five hours and then preheated in air at 900° C. for one hour. Subsequent to cooling the reaction product is again ground in alcohol for two hours, after which the ground product is pressed to form a ring. This ring is heated in oxygen at about 1400° C. for two hours.

By varying the ratio between the quantities of copper oxide and nickel carbonate in the starting material, annular cores of different composition may be made. Of a few of these magnet cores the following table shows the composition, the value of the quotient $$\frac{B_r}{B_{cl}}$$

the value of $(R_s)_{max}$ and the value of $H_c$.

| Composition | $\frac{B_r}{B_{sl}}$ | $(R_s)_{max}$ | $H_c$ |
|---|---|---|---|
| $Cu_{0.01}Ni_{0.99}Fe_2O_4$ | 0.70 | 0.65 | 3.2 |
| $Cu_{0.03}Ni_{0.97}Fe_2O_4$ | 0.78 | 0.70 | 3.0 |
| $Cu_{0.05}Ni_{0.95}Fe_2O_4$ | 0.70 | 0.70 | 2.8 |

What is claimed is:

1. In a method of manufacturing a magnet core having a substantially rectangular hysteresis loop in which $$\frac{B_r}{B_{cl}}$$

is not less than 0.70, $(R_s)_{max}$ is not less than 0.6 and $H_c$ is less than 4, the step of heating in an atmosphere containing more than 50% by volume of oxygen at a temperature of about 1375° to 1450° C., a mixture of oxides of copper, nickel and iron in proportions at which a composition having the following formula is formed:

$$Cu_xNi_{(1-x)}Fe_2O_4$$

$x$ being between 0.01 and 0.05.

2. A magnet made in accordance with the method defined in claim 1.

References Cited in the file of this patent

FOREIGN PATENTS 697,219    Great Britain _____ Sept. 16, 1953

OTHER REFERENCES

Physica III, No. 6, June 1936, pages 476–479.
Journal of the Institute of Elec. Eng. of Japan (1939); pertinent pp. 5, 279 and 380.
Philips: Technical Review, v. 16, No. 2, pp. 49–58.